(12) United States Patent
O'Banion et al.

(10) Patent No.: US 6,183,527 B1
(45) Date of Patent: Feb. 6, 2001

(54) DUST COLLECTOR WITH WORK SURFACE

(75) Inventors: Michael L. O'Banion, Westminster; Daniel Puzio, Baltimore; Kendall D. Smith, Eldersburg, all of MD (US)

(73) Assignee: Black & Decker Inc., Newark, DE (US)

(*) Notice: Under 35 U.S.C. 154(b), the term of this patent shall be extended for 0 days.

(21) Appl. No.: 09/212,951

(22) Filed: Dec. 15, 1998

Related U.S. Application Data

(60) Provisional application No. 60/073,413, filed on Feb. 2, 1998, now abandoned.

(51) Int. Cl.[7] .............................. B01D 50/00; A47L 7/00
(52) U.S. Cl. .............................. 55/385.1; 55/429; 55/439; 55/465; 55/502; 55/DIG. 18; 15/347
(58) Field of Search .................................. 55/385.1, 429, 55/439, 437, 434, 502, 462, 465, DIG. 3, DIG. 18, 418, 419, 438; 15/301, 300.1, 314, 327.6, 347; 144/252.1, 252.2; 409/137; 451/453

(56) References Cited

U.S. PATENT DOCUMENTS

| | | |
|---|---|---|
| Re. 32,257 | 10/1986 | Dyson . |
| D. 303,172 | 8/1989 | Goodrich . |
| D. 326,544 | 5/1992 | Yamamoto . |
| D. 343,706 | 1/1994 | Gurstein . |
| D. 369,812 | 5/1996 | Miller . |
| D. 370,320 | 5/1996 | Hachtmann . |
| 513,434 | 1/1894 | Miller . |
| 928,673 | 7/1909 | Lebrasseur . |
| 1,026,371 * | 5/1912 | Smith . |
| 1,316,442 * | 9/1919 | Goughnour . |
| 1,619,295 | 3/1927 | Gardner . |
| 2,010,128 | 8/1935 | Arnold . |
| 2,230,453 | 2/1941 | Fitch . |
| 2,392,872 | 1/1946 | Wolfe . |
| 2,538,972 | 1/1951 | Magnani . |
| 2,630,879 * | 3/1953 | Hage . |
| 2,684,125 | 7/1954 | Brace . |
| 2,995,204 | 8/1961 | Prostshakov . |
| 3,022,806 * | 2/1962 | Johnston . |

(List continued on next page.)

FOREIGN PATENT DOCUMENTS

| | | |
|---|---|---|
| 1241158 | 8/1988 | (CA) . |
| 2338081 | 7/1973 | (DE) . |
| 7439765 | 11/1974 | (DE) . |
| 8111233 | 4/1981 | (DE) . |
| 3246833 | 12/1982 | (DE) . |
| 3922536 | 7/1989 | (DE) . |
| 0634905 | 3/1998 | (EP) . |
| 9516382 | 6/1995 | (WO) . |

* cited by examiner

Primary Examiner—David A. Simmons
Assistant Examiner—Fred Prince
(74) Attorney, Agent, or Firm—Adan Ayala

(57) ABSTRACT

A dust collector includes a main housing, a dust inlet disposed on the main housing, an air outlet disposed on the main housing, and an inclined filter disposed within the main housing and between the dust inlet and the air outlet. Preferably, the filter is pleated. The dust collector may also include a removable bin disposed within the main housing and preferably disposed below the filter. A seal may be disposed between the bin and the main housing. Similarly, the dust collector may also include a removable liner disposed within the main housing and preferably disposed below the filter. A seal may be disposed between the liner and the main housing. A baffle may be disposed within the main housing and preferably disposed between the filter and the dust inlet. The main housing may comprise a bottom portion and a top portion pivotally attached to the bottom portion. The dust inlet is preferably disposed on the top portion. Similarly, the air outlet is preferably disposed on the top portion. The filter is also preferably disposed within the top portion.

25 Claims, 6 Drawing Sheets

U.S. PATENT DOCUMENTS

| | | | |
|---|---|---|---|
| 3,046,718 | * | 7/1962 | Ide et al. . |
| 3,295,298 | | 1/1967 | Mackey . |
| 3,308,609 | | 3/1967 | McCulloch et al. . |
| 3,343,344 | * | 9/1967 | Fairaizl . |
| 3,543,325 | * | 12/1970 | Hamrick . |
| 3,616,624 | * | 11/1971 | Marsh . |
| 3,870,082 | | 3/1975 | Holl . |
| 3,877,908 | | 4/1975 | Phelps et al. . |
| 3,880,047 | * | 4/1975 | Dosier . |
| 3,885,932 | | 5/1975 | Moore, Jr. et al. . |
| 3,925,044 | | 12/1975 | Tu et al. . |
| 4,088,164 | | 5/1978 | McCord, Jr. . |
| 4,118,208 | * | 10/1978 | Klinedinst . |
| 4,201,256 | * | 5/1980 | Truhan . |
| 4,240,882 | * | 12/1980 | Ang et al. . |
| 4,268,288 | | 5/1981 | Coombs . |
| 4,276,070 | * | 6/1981 | Hug . |
| 4,342,131 | * | 8/1982 | Reid . |
| 4,358,300 | | 11/1982 | Schlapman et al. . |
| 4,377,882 | | 3/1983 | Dyson . |
| 4,393,969 | | 7/1983 | Woell . |
| 4,458,736 | | 7/1984 | Trevor . |
| 4,463,474 | | 8/1984 | Jacobs . |
| 4,485,859 | | 12/1984 | Krogstad et al. . |
| 4,571,772 | | 2/1986 | Dyson . |
| 4,573,236 | | 3/1986 | Dyson . |
| 4,593,429 | | 6/1986 | Dyson . |
| 4,594,747 | | 6/1986 | Dempsey . |
| 4,608,062 | | 8/1986 | Hughes . |
| 4,643,748 | | 2/1987 | Dyson . |
| 4,644,833 | | 2/1987 | Jenkner . |
| 4,697,389 | * | 10/1987 | Romine . |
| 4,715,872 | | 12/1987 | Snyder . |
| 4,819,417 | | 4/1989 | Bryant et al. . |
| 4,826,515 | | 5/1989 | Dyson . |
| 4,840,169 | * | 6/1989 | Folsom . |
| 4,853,008 | | 8/1989 | Dyson . |
| 4,853,011 | | 8/1989 | Dyson . |
| 4,932,449 | | 6/1990 | Omoto . |
| 4,936,318 | | 6/1990 | Schoolman . |
| 4,947,510 | * | 8/1990 | English . |
| 4,977,638 | | 12/1990 | Best . |
| 5,062,870 | | 11/1991 | Dyson . |
| 5,078,761 | | 1/1992 | Dyson . |
| 5,090,976 | | 2/1992 | Dyson . |
| 5,101,532 | | 4/1992 | Dyson et al. . |
| 5,105,698 | | 4/1992 | Dunham . |
| 5,145,499 | | 9/1992 | Dyson . |
| 5,160,356 | | 11/1992 | Dyson . |
| 5,211,092 | | 5/1993 | Blasi . |
| 5,230,722 | | 7/1993 | Yonkers . |
| 5,267,371 | | 12/1993 | Soler et al. . |
| 5,396,937 | | 3/1995 | Clausen . |
| 5,403,367 | | 4/1995 | De Villiers et al. . |
| 5,480,464 | | 1/1996 | De Villiers et al. . |
| 5,491,870 | | 2/1996 | Holmes . |
| 5,511,764 | * | 4/1996 | Wonsetler . |
| 5,525,396 | * | 6/1996 | Rudolph et al. . |
| 5,582,225 | | 12/1996 | Schank . |
| 5,606,767 | | 3/1997 | Crlenjak et al. . |
| 5,753,106 | * | 5/1998 | Schenck . |
| 5,762,691 | * | 6/1998 | Gondar . |
| 5,775,395 | * | 7/1998 | Wilkins . |
| 5,807,414 | * | 9/1998 | Schaefer . |
| 5,840,103 | * | 11/1998 | Dyson . |
| 5,882,155 | * | 3/1999 | Testa, Jr. . |
| 5,954,925 | * | 9/1999 | Sherman . |
| 5,993,124 | * | 11/1999 | Cooper et al. . |
| 6,024,144 | * | 2/2000 | Qian . |

DUST COLLECTOR WITH WORK SURFACE

CROSS-REFERENCE TO RELATED APPLICATIONS

The present application derives from U.S. application Ser. No. 60/073,413, filed Feb. 2, 1998, now abandoned.

FIELD OF THE INVENTION

This invention relates generally to dust collectors and, more particularly, to a portable heavy-duty dust collector.

BACKGROUND OF THE INVENTION

Many commercial woodworking or cabinet shops have relatively effective dust collection systems. However, such systems are elaborate, with a significant cost for each work station being serviced. These systems tend to include a large centrifugal dust collector, which has a substantially cylindrical shape and is between 5 to 8 feet high. As such, a heavy-duty centrifugal dust collector is very heavy and thus not portable. Accordingly, each work station has a dust hose tube connected to the large centrifugal dust collector, as the dust collector cannot be moved between work stations.

Such systems are not readily available to an individual woodworker who has his equipment in a home basement or garage. Among the reasons are size, complexity and costs. Similarly, such systems are impractical for contractors building a house, for example, as the dust collector cannot be easily moved or carried to the jobsite. Also, such systems are not easily expanded to accommodate new equipment brought into the shop.

Accordingly, it is an object of the invention to provide a heavy-duty portable dust collector.

SUMMARY OF THE INVENTION

In accordance with the present invention, an improved dust collector is employed. The dust collector includes a main housing, a dust inlet disposed on the main housing, an air outlet disposed on the main housing, and an inclined filter disposed within the main housing and between the dust inlet and the air outlet. Preferably, the filter is pleated. The dust collector may also include a removable bin disposed within the main housing and preferably disposed below the filter. A seal may be disposed between the bin and the main housing. Similarly, the dust collector may also include a removable liner disposed within the main housing and preferably disposed below the filter. A seal may be disposed between the liner and the main housing. A baffle may be disposed within the main housing and preferably disposed between the filter and the dust inlet.

The main housing may comprise a bottom portion and a top portion pivotally attached to the bottom portion. The dust inlet is preferably disposed on the top portion. Similarly, the air outlet is preferably disposed on the top portion. The filter is also preferably disposed within the top portion.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
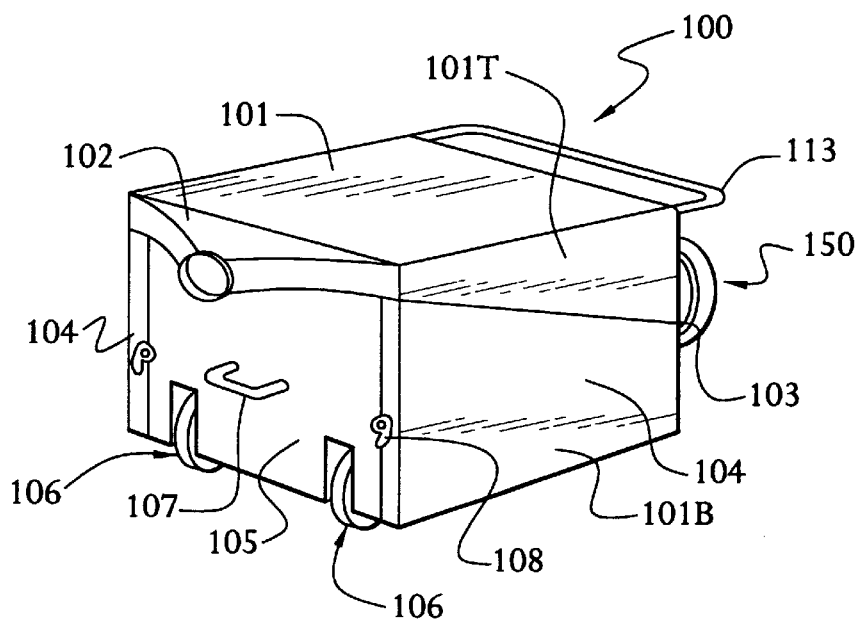
FIG. 1 is a perspective view of a dust collector according to the present invention.
Figure 2:
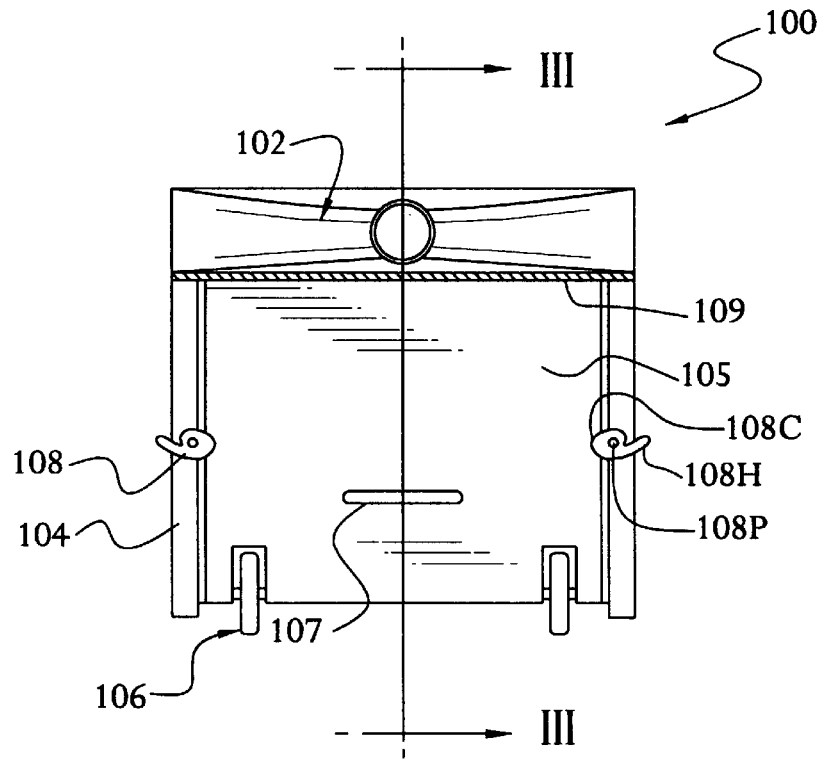
FIG. 2 is a front view of the dust collector of FIG. 1.
Figure 3:
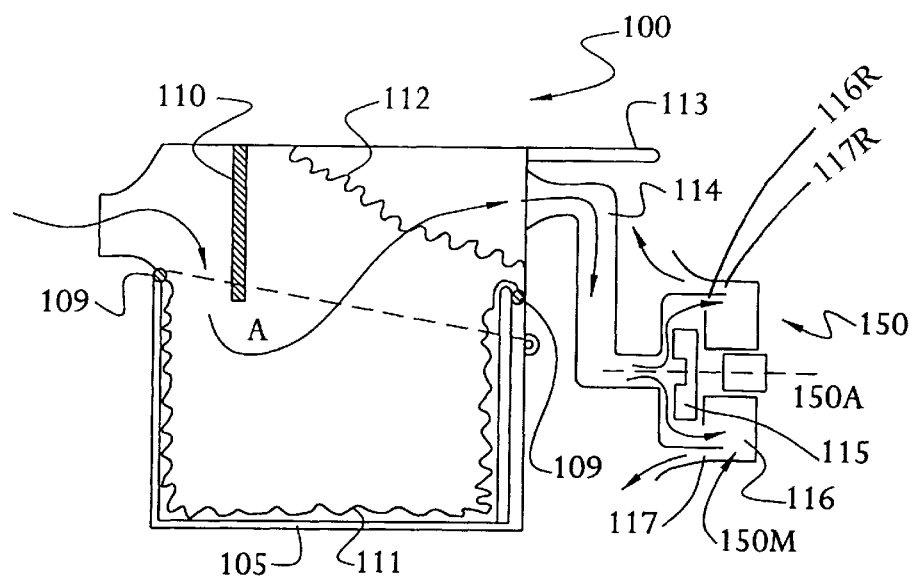
FIG. 3 is a cross-sectional view of the dust collector along line III—III of FIG. 2.

With reference to FIGS. 1–3, a dust collector 100 according to the present invention is shown. The dust collector 100 has a main housing 101. Main housing 101 has two main portions: a bottom portion 101B and a top portion 101T disposed on the bottom portion 101B. Preferably, the top portion 101T is pivotally attached to the bottom portion 101B via hinge 103.

The bottom portion 101B may have a dust bin 105 removably disposed therein. Walls 104 of bottom portion 101B may surround bin 105. Wheels 106 may be disposed on the walls 104 to facilitate movement of the dust collector 100. Persons skilled in the art, however, will recognize that wheels may be placed instead or in addition at the bottom of bin 105 to facilitate removal of the bin and/or movement of the dust collector 100. In addition, bin 105 may have a handle 107 to facilitation removal of the bin 105 from the bottom portion 101B.

Cam mechanisms 108 may be disposed on the bottom portion 101B to the bin 105. Basically, these cam mechanisms 108 pivot about a pin 108P as the user rotates them using handle 108H. Cam portion 108C then pushes dust bin 105 into the bottom portion 101B.

Bin 105 may also have a removable liner 111. Preferably, the liner 111 is made of plastic.

The top portion 101T may have a dust inlet 102, preferably in a side wall. The dust inlet 102 may be adapted to couple to a hose (not shown), as is known in the art. The top portion 101T may also have an air outlet 114, preferably in a side wall, which is connected to fan housing 150.

A filter 112 is disposed within the top portion 101T between the dust inlet 102 and the air outlet 114. Preferably, the filter 112 is pleated for increased effective filtering area. In addition, the filter 112 may be disposed in a substantially diagonal orientation, between the top and rear walls of the top portion 101T. The filter 112 may be made of synthetic or natural fibers.

A seal 109 is provided between the main housing 101 and the dust bin 105 and/or liner 111. Similarly, a seal may be provided between top and bottom portions 101T and 101B.

As mentioned above, fan housing 150 is connected to the main housing 101 via dust outlet 114. Preferably, the fan housing 150 has a substantially cylindrical profile with a longitudinal axis 150A. The fan housing 150 contains a fan 115 driven by a motor M. The fan 115 is oriented so that air is removed from dust collector 100.

A muffler 150M may be integrated in the fan housing 150. The fan housing 150 has a blade chamber 150C. Preferably, muffler 150M is adapted so that air can exit in any radial direction from the axis 150A to obtain a 3600 exhaust.

This can be accomplished by providing a first annular muffler chamber 116 being coaxial with the fan housing 150. A second annular muffler chamber 117 is disposed around and connected to the first muffler chamber 116. The second muffler chamber 117 is coaxial with the fan housing 150 and the first muffler chamber 116. The air can then exit from the second muffler chamber 117.

Preferably, the cross-section of the muffler chamber 116 will be about 50 square inches, i.e., 5" times 5" times 2 (the number of areas on both sides of motor M), as discussed below. Similarly, the cross-section of the blade chamber 150C is preferably 50 square inches, excluding the effective area taken up by the fan blades 115. Further, the width of the passages 116R and 117R, each respectively connecting the blade chamber 150C with muffler chamber 116 and muffler chamber 116 with muffler chamber 117, is preferably aboput 0.375 inches.

The analysis for obtaining the above-mentioned measurements is derived from the book Noise Reduction, pp. 417–418 (Leo Beranek, ed., 1960), which is incorporated herein by reference. Accordingly, these measurements are derived as follow:

Assuming a fan speed of 3450 rpm and a fan having 6 blades, the frequency (f) will be 345 Hertz (3450 rpm times 6 blades divided by 60 seconds). Lambda ($\lambda$) is approximately 1130/f, i.e., 1130/345 or 3.27 ft. Wave number (k) is then equal to $2\pi/\lambda$, i.e., 1.9215 ft$^{-1}$.

Parameter kl (wave number times muffler dimensional length) affects the behavior of an expansion chamber. The ideal kl for maximum noise reduction is about 1.6. Because the value of k is 1.9215 ft$^{-1}$, the ideal muffler length I is 0.8327 ft, or about ten inches. Similarly, if a 12-blade fan is used, the ideal muffler length I under the above analysis is then about five inches.

Assuming an outer muffler diameter of 24 inches, a six inch duct feeds into the muffler and that the aperture exhaust area is kept equal to minimize pressure build-up, the width of annular apertures 116R, 117R will be approximately equal to the cross-sectional area of the duct ($0.5\pi d^2$) divided by the circumference of the muffler ($24\pi$). Therefore, the width is about 0.375 inches.

During operation of the dust collector 100 described above, the air loaded with dust particles and chips comes in through dust inlet 102. The air flow will follow two main courses: (1) go directly to filter 112; and (2) go downwardly towards the bin 105 and then upwardly to filter 112. Either way, the filter 112 will filter the outgoing air flow.

However, if the air flow follows the second course, the heavier elements and chips will drop to the bottom of the bin 105 before the air flow goes upwardly towards filter 112. Filter 112 then extracts the finer dust particles from the air flow. Because the dust particles are removed in two different places, the dust collector 100 is a two-stage dust collector. In addition, because the two stages of dust removal occur within one chamber, the dust collector is a single-chamber, two-stage dust collector.

Because the air flow enters into main housing 101 at a substantially velocity, it may be advantageous to provide a baffle 110 between dust inlet 102 and filter 112 to slow down the air flow and distribute wood more uniformly within main housing 101. Baffle 110 is provided across the path of the incoming air flow to facilitate the heavier elements of the flow to drop to the bottom of main housing 101 and for the air to be exhausted from the housing 101 through filter 112. Baffle 110 also helps minimizes the number of chips and heavier elements that collide against the filter 112, ensuring longer life and better efficiency for the filter. Preferably, baffle 110 protrudes downwardly from the top of housing 101.

The air flow then exits the main housing 101 via air outlet 114 and goes through the fan housing 150. The air flow passes through fan 115 into the first muffler chamber 116, then enters the second muffler chamber 117 while reversing its direction and finally exits the second muffler chamber 117.

The user can then remove the bin 105 by lifting top portion 101T, pivoting cam mechanisms 108 and pulling out bin 105 and/or liner 111. Similarly, the user can replace the filter 112 by lifting top portion 101T and removing the old filter 112.

Preferably, top portion 101T is substantially flat so that it can be used as a work area. Accordingly, a user can put a planer or table saw on the top portion 101T. This is advantageous as the dust collector 100 would have two functions: (1) collecting dust; and (2) providing a useable work area; thus increasing the utility of such dust collector.

Figure 6:
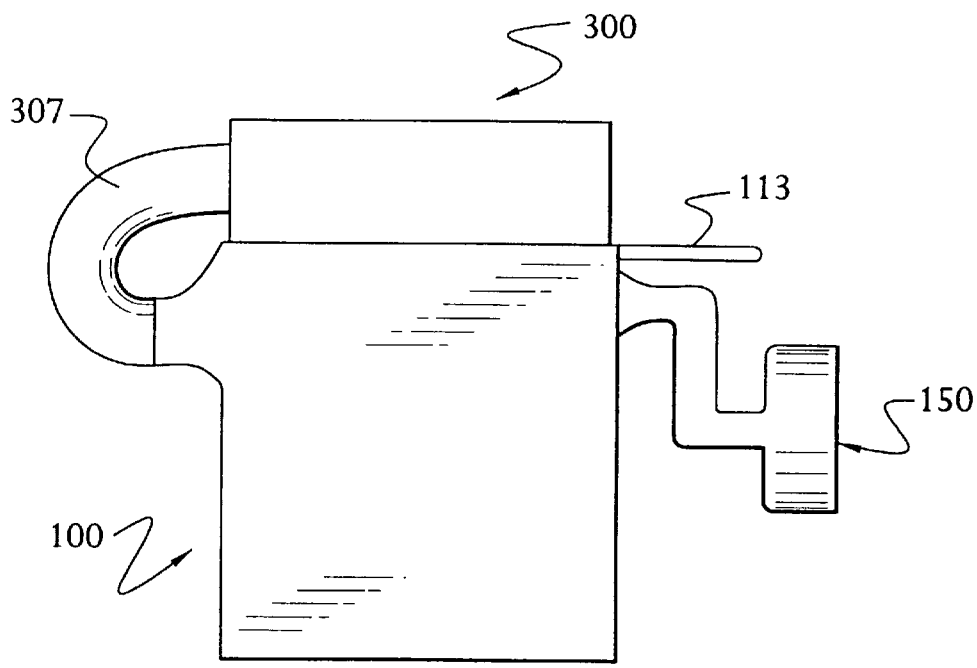
FIG. 6 is a right side view of the dust collector with a down-draft table.

If desired, a downdraft table 300 may be disposed on top of dust collector 100, as shown in FIG. 6. Downdraft table 300 may be connected to dust collector 100 via a hose 307.

Figure 7:
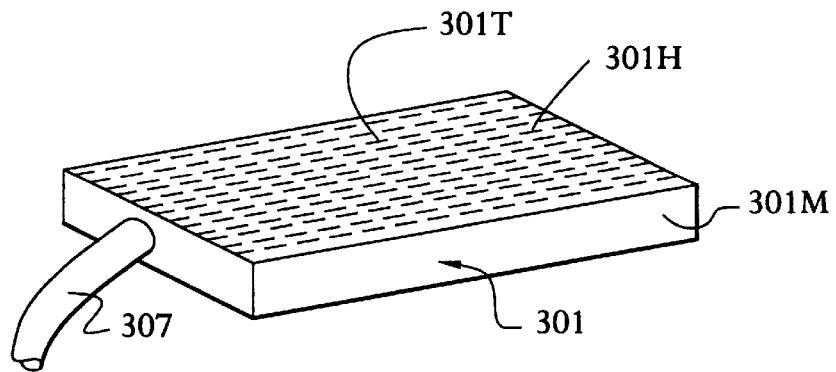
FIG. 7 is a perspective view of a first down-draft table.

One embodiment of downdraft table 300 is shown as table 301 in FIG. 7. Basically, table 301 has a sealed housing 301M, which is constructed of solid walls (except for top 301T, as discussed below). The top 301T of housing 301M is a punctured board, with a plurality of holes 301H. As known in the art, when a work operation is conducted on the table 301, dust goes through holes 301H, into housing 301 M and exits through hose 307.

Figure 8:
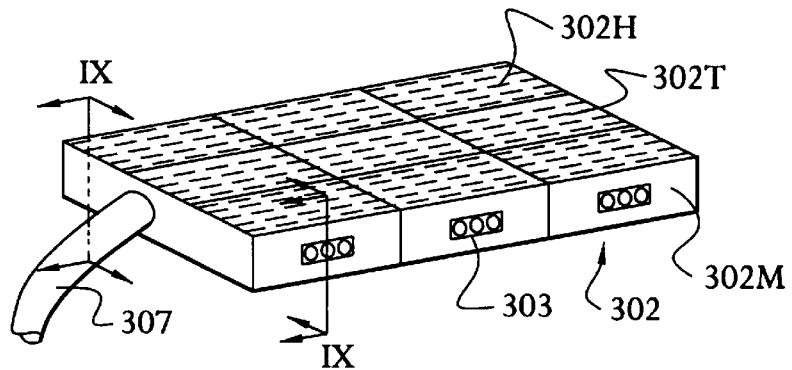
FIG. 8 is a perspective view of a second down-draft table.

A second embodiment of downdraft table 300 is shown as table 302 in FIG. 8. Like table 301, table 302 has a sealed housing 302M, which is constructed of solid walls (except for top 302T, as discussed below). The top 302T of housing 302M is a punctured board, with a plurality of holes 302H. As known in the art, when a work operation is conducted on the table 302, dust goes through holes 302H, into housing 302M and exits through hose 307.

Figure 9:
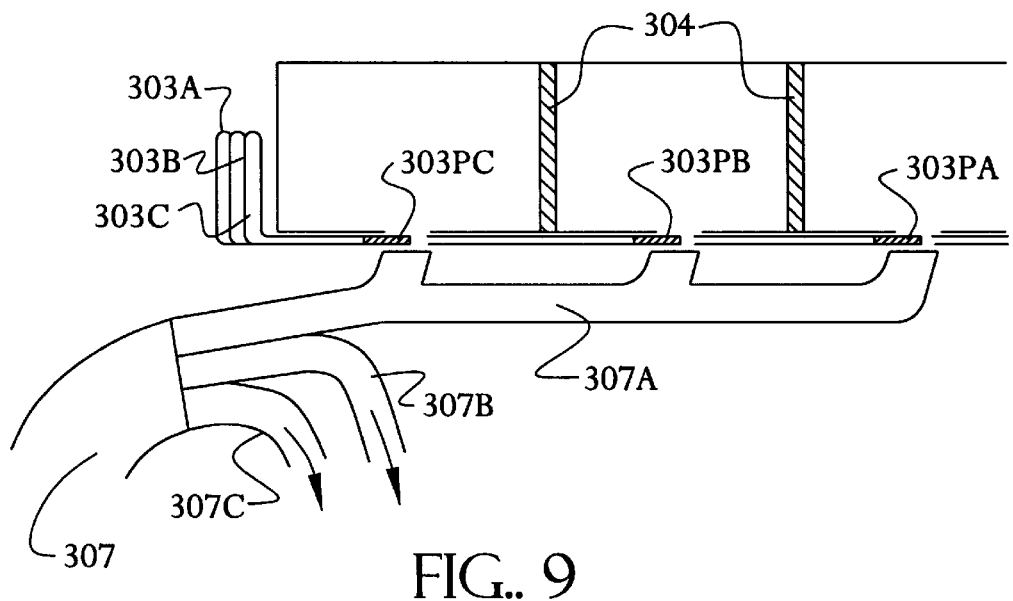
FIG. 9 is a partial cross-sectional view of the second down-draft table along plane IX—IX—IX—IX of FIG. 8.

Referring to FIGS. 8 and 9, table 302 also has internal walls 304, which divide the housing 302M into discrete dust collecting areas. Table 302 should have at least two discrete collecting areas, which can be opened or closed for dust collection via controls 303. As shown in FIG. 9, three controls 303A, 303B, 303C are used to control which area(s) collects dust. When a user pulls on control 303A, plug 303PA uncovers hose 307A, thus allowing dust collection in the area above hose 307A. Similarly, controls 303B and 303C control plugs 303PB and 303PC, respectively. With such arrangement, each dust collecting area can be individually opened or closed.

Preferably hose 307A is connected to the three dust collecting areas and to hose 307. However, separate hoses, such as 307B and 307C, can be provided for each individual area.

Figure 10:
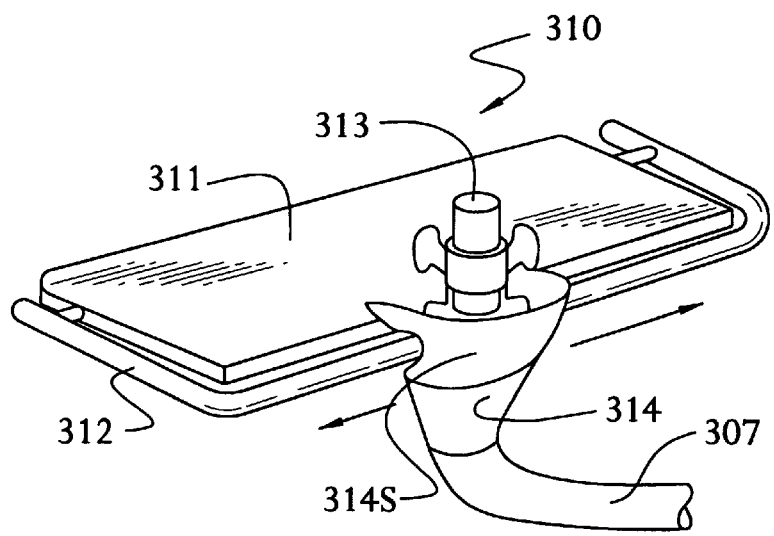
FIG. 10 is a perspective view of a third down-draft table.

Referring to FIG. 10, a router table 310 for routing operations may be disposed on top of dust collector 100. Router table 310 has a main table 311 for supporting a workpiece. Main table 311 is disposed on top portion 101T and may have a rail 312 disposed thereon.

A slide assembly 314 may be slidably disposed on rail 312. Slide assembly 314 includes a shroud 314S. Shroud 314 can support a router 313 disposed thereon. Slide assembly 314 is connected to hose 307. Accordingly, as router 313 is used on a workpiece, resulting dust will be collected in shroud 314S and into hose 307. Persons skilled in the art may refer to U.S. Pat. No. 4,088,164, which is wholly incorporated herein by reference.

Figure 4:
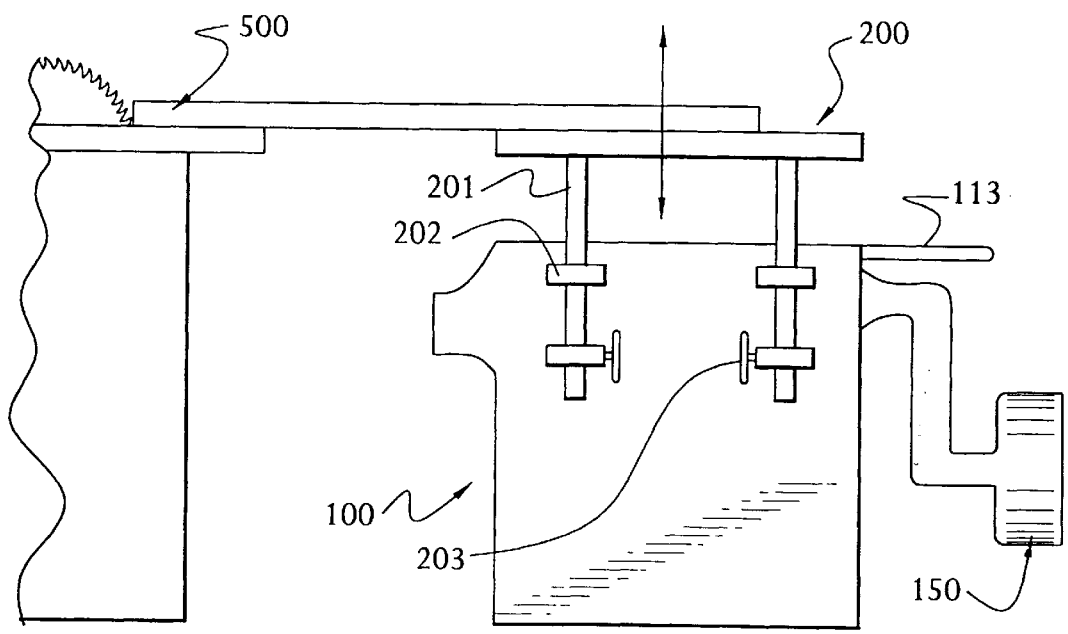
FIG. 4 is a right side view of the dust collector with an accessory table.

Referring to FIG. 4, a user can also put the dust collector 100 behind a table saw 500 to act as an ouffeed table. If needed, an accessory table 200 may be installed on dust collector 100 to properly support any workpieces. Preferably, accessory table 200 is vertically adjustable, so that a user can set the height of the table 200 to match the height of the table of table saw 500. The table 200 may rest on posts 201, which in turn are slidably attached to brackets 202. Brackets 202 may be fixedly attached to main housing 101. Preferably, at least two brackets 202 are provided per post 201 to ensure alignment. It is also preferable that a set screw 203 is provided for each post 201 to secure the position of post 201 relative to brackets 202. By providing a set screw 203 per post 201, table 200 can be adjusted to match the plane of the table saw 500, even if the workshop floor is not perfectly flat.

Figure 5:
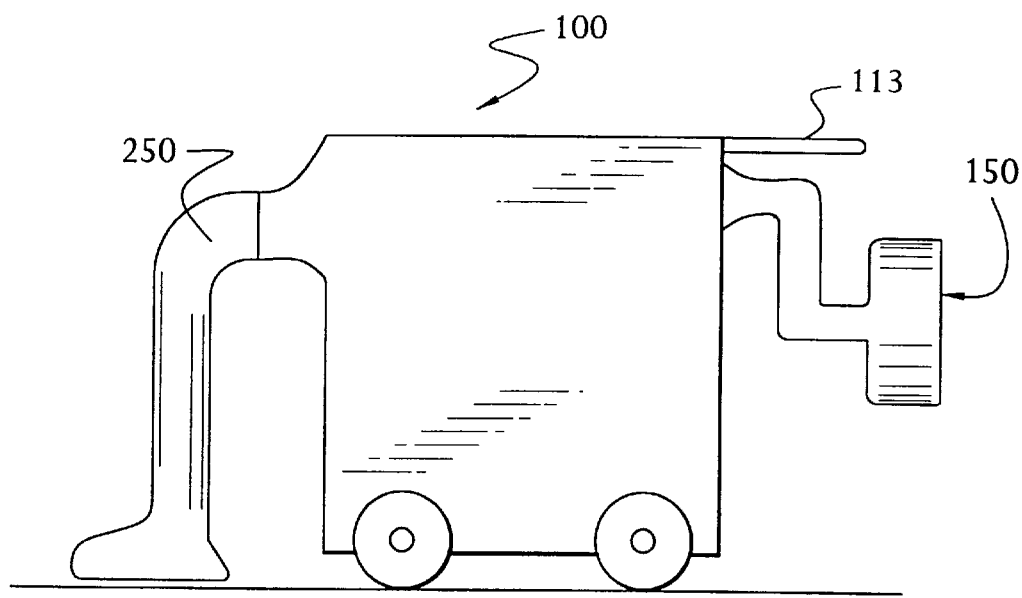
FIG. 5 is a right side view of the dust collector with a floor sweeper accessory.

Referring to FIG. 5, a floor sweeper attachment 250 may be attached to the dust inlet 102 of dust collector 100. A handle 113 attached to the dust collector 100 allows a user to push the dust collector around the workshop floor, effectively converting a heavy-duty dust collector into a movable vacuum cleaner.

Figure 11:
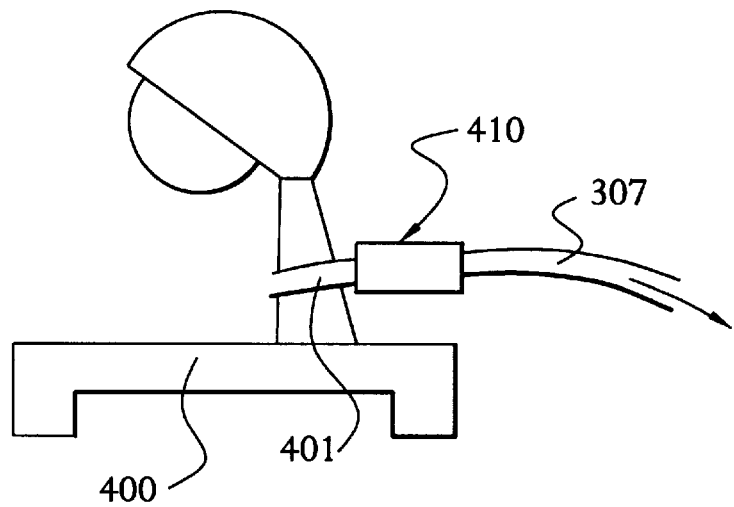
FIG. 11 is a side view of a power tool with a dust duct accessory.

Hose 307 may also be connected to other power tools with smaller dust exhaust ducts. Usually, power tools with small dust exhaust ducts do not operate efficiently with low vacuum pressure/high air flow dust collectors. Accordingly, a dust duct accessory 410 is connected to the dust exhaust duct 401 of power tool 400 and to hose 307, as shown in FIG. 11. Preferably, dust duct accessory 410 increases the vacuum pressure at the duct 401 without restricting the high air flow of the dust collector.

Figure 12:
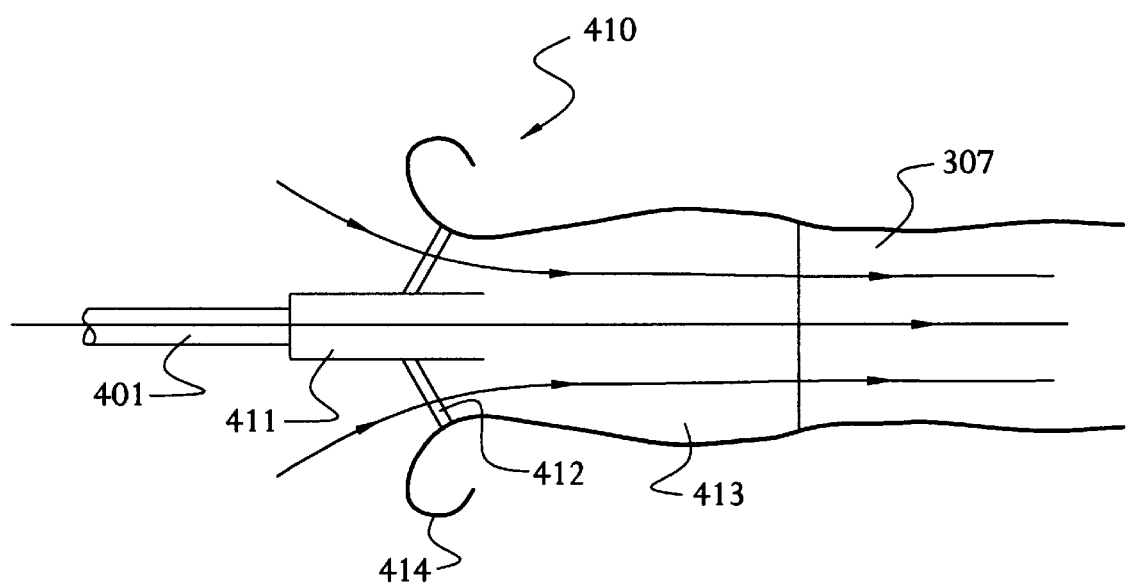
FIG. 12 is a cross-sectional view of the dust duct accessory of FIG. 11.

A preferable dust duct accessory 410 is shown in FIG. 12. Typically, the diameter of dust duct 401 will be about 1.5 inches, while the diameter of hose 307 may be about four or five inches. Dust duct 401 is connected to connector 411. Connector 411 is attached to main body 413 via ribs 412. Because main body 413 has a greater diameter than connector 411, a venturi effect is created within main body 413, creating an increased vacuum at connector 411.

Main body 413 may have a bell mouth inlet 414 for improved orifice coefficient and air flow. Because of the improved air flow, spurious dust created by the power tool and not collected through duct 401 may nevertheless be collected via dust duct accessory 410.

Persons skilled in the art may also recognize other alternatives to the means disclosed herein. However, all these additions and/or alterations are considered to be equivalents of the present invention.

We claim:

1. A dust collector comprising:
   a main housing;
   a dust inlet disposed on the main housing;
   an air outlet disposed on the main housing;
   a hose connected to the dust inlet at a first end;
   a filter disposed within the main housing and between the dust inlet and the air outlet; and
   a downdraft table connected to a second end of the hose, and the downdraft table is disposed on the dust collector;
   wherein the main housing has a substantially flat top surface for use as a work surface.

2. The dust collector of claim 1, wherein the filter is pleated.

3. The dust collector of claim 1, wherein the filter is inclined.

4. The dust collector of claim 1, further comprising a removable bin disposed within the main housing.

5. The dust collector of claim 4, wherein the bin is disposed below the filter.

6. The dust collector of claim 4, further comprising a seal disposed between the bin and the main housing.

7. The dust collector of claim 1, further comprising a removable liner disposed within the main housing.

8. The dust collector of claim 7, wherein the liner is disposed below the filter.

9. The dust collector of claim 7, further comprising a seal disposed between the liner and the main housing.

10. The dust collector of claim 1, further comprising a baffle disposed within the main housing.

11. The dust collector of claim 10, wherein the baffle is disposed between the filter and the dust inlet.

12. The dust collector of claim 10, wherein the baffle directs airflow downwardly.

13. The dust collector of claim 12, wherein the airflow moves upwardly through the filter, after being directed downwardly.

14. The dust collector of claim 1, further comprising an attachment having two ends, the attachment being attached to the dust inlet at a first end.

15. The dust collector of claim 14, wherein the second end is located near floor.

16. The dust collector of claim 1, further comprising a handle attached to the main housing.

17. The dust collector of claim 1, wherein the main housing comprises a bottom portion and a top portion pivotally attached to the bottom portion.

18. The dust collector of claim 17, wherein the dust inlet is disposed on the top portion.

19. The dust collector of claim 17, wherein the air outlet is disposed on the top portion.

20. The dust collector of claim 17, wherein the filter is disposed within the top portion.

21. The dust collector of claim 1, wherein the filter is subtantially horizontal.

22. A dust collector comprising:
   a main housing;
   a dust inlet disposed on the main housing;
   an air outlet disposed on the main housing;
   a hose connected to the dust inlet at a first end;
   a filter disposed within the main housing and between the dust inlet and the air outlet; and
   a downdraft table connected to a second end of the hose, wherein the downdraft table has two separate collecting areas, at least one of said areas being individually closeable;
   wherein the main housing has a substantially flat top surface for use as a work surface.

23. A dust collector comprising:
   a main housing;
   a dust inlet disposed on the main housing;
   an air outlet disposed on the main housing;
   a filter disposed within the main housing and between the dust inlet and the air outlet;
   a hose connected to the dust inlet at a first end; and a table disposed on said main housing, the table being vertically movable.

24. The dust collector of claim 23, wherein the filter is substantially horizontal.

25. The dust collector of claim 23, wherein the filter is pleated.

* * * * *